United States Patent
Rankin et al.

(10) Patent No.: US 10,574,439 B2
(45) Date of Patent: Feb. 25, 2020

(54) SYSTEM AND METHOD FOR SECURE COMMUNICATION USING RANDOM BLOCKS OR RANDOM NUMBERS

(71) Applicants: John Rankin, Morgantown, WV (US); Phillip Wayne Coffelt, North Canton, OH (US); Wilberto Nemrod Salazar, Sylmar, CA (US)

(72) Inventors: John Rankin, Morgantown, WV (US); Phillip Wayne Coffelt, North Canton, OH (US); Wilberto Nemrod Salazar, Sylmar, CA (US)

(73) Assignee: John Rankin, Morgantown, WV (US)

( * ) Notice: Subject to any disclaimer, the term of this patent is extended or adjusted under 35 U.S.C. 154(b) by 0 days.

(21) Appl. No.: 16/263,007

(22) Filed: Jan. 31, 2019

(65) Prior Publication Data
US 2019/0238315 A1 Aug. 1, 2019

Related U.S. Application Data

(60) Provisional application No. 62/624,179, filed on Jan. 31, 2018.

(51) Int. Cl.
*H04L 9/00* (2006.01)
*H04L 9/06* (2006.01)
*H04L 9/08* (2006.01)
*G06F 7/58* (2006.01)

(52) U.S. Cl.
CPC .......... *H04L 9/0625* (2013.01); *H04L 9/0869* (2013.01); *G06F 7/582* (2013.01)

(58) Field of Classification Search
CPC ............... H04L 9/0637; H04L 2209/08; H04L 2209/20; H04L 9/3242; H04L 9/0656
See application file for complete search history.

(56) References Cited

U.S. PATENT DOCUMENTS

| | | |
|---|---|---|
| 3,688,090 A | 8/1972 | Rankin |
| 5,727,062 A | 3/1998 | Ritter |
| 6,023,724 A | 2/2000 | Bhatia et al. |
| 6,567,416 B1 | 5/2003 | Chuah |
| 6,714,985 B1 | 3/2004 | Malagrino et al. |
| 6,757,248 B1 | 6/2004 | Li et al. |
| 7,103,025 B1 | 9/2006 | Choksi |
| 8,374,091 B2 | 2/2013 | Chiang |
| 8,397,151 B2 | 3/2013 | Salgado et al. |
| 9,350,663 B2 | 5/2016 | Rankin |

(Continued)

OTHER PUBLICATIONS

Information Sciences Institute, University of Southern California, RFC 791, Internet Protocol, DARPA Internet Program Protocol Specification, Sep. 1981.

(Continued)

*Primary Examiner* — Ghazal B Shehni
(74) *Attorney, Agent, or Firm* — Standley Law Group LLP

(57) ABSTRACT

A system and method for secure communication is provided. A sending device encrypts a first starting block with one of a number of random blocks. The encrypted first starting block is sent to a receiving device, which expands it by a random amount. The expanded block is divided into a first expanded block and a second expanded block. A source data block is encrypted with the second expanded block and transmitted to the receiving device, where it is decrypted with the decrypted first starting block. The first expanded block replaces the starting block for subsequent transmission.

20 Claims, 3 Drawing Sheets

(56) References Cited

U.S. PATENT DOCUMENTS

| | | |
|---|---|---|
| 2001/0017844 A1 | 8/2001 | Mangin |
| 2002/0041592 A1 | 4/2002 | Van Der Zee et al. |
| 2002/0054570 A1 | 5/2002 | Takeda |
| 2002/0071436 A1 | 6/2002 | Border et al. |
| 2003/0031198 A1 | 2/2003 | Currivan et al. |
| 2005/0286517 A1 | 12/2005 | Babbar et al. |
| 2006/0002681 A1 | 1/2006 | Spilo et al. |
| 2006/0034317 A1 | 2/2006 | Hong et al. |
| 2006/0133364 A1 | 6/2006 | Venkatsubra |
| 2007/0223395 A1 | 9/2007 | Lee et al. |
| 2010/0002868 A1 | 1/2010 | Willoughby |
| 2010/0103830 A1 | 4/2010 | Salgado et al. |
| 2011/0149891 A1 | 6/2011 | Ramakrishna |
| 2012/0289250 A1 | 11/2012 | Fix et al. |
| 2012/0300648 A1 | 11/2012 | Yang |
| 2012/0307678 A1 | 12/2012 | Gerber et al. |
| 2013/0028121 A1 | 1/2013 | Rajapakse |
| 2013/0058231 A1 | 3/2013 | Paddon et al. |
| 2013/0094650 A1 | 4/2013 | Mendel |
| 2014/0100014 A1 | 4/2014 | Bennett, III et al. |
| 2014/0254598 A1 | 9/2014 | Jha et al. |
| 2014/0294019 A1 | 10/2014 | Quan et al. |
| 2015/0100613 A1 | 4/2015 | Osiecki et al. |
| 2015/0229714 A1 | 8/2015 | Venkatsubra et al. |
| 2016/0269294 A1 | 9/2016 | Rankin |
| 2017/0090872 A1 | 3/2017 | Mathew et al. |
| 2017/0279603 A1 | 9/2017 | Chen et al. |
| 2018/0018147 A1 | 1/2018 | Sugawara |
| 2018/0102975 A1 | 4/2018 | Rankin |

OTHER PUBLICATIONS

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

SYSTEM AND METHOD FOR SECURE COMMUNICATION USING RANDOM BLOCKS OR RANDOM NUMBERS

CROSS-REFERENCE TO RELATED APPLICATIONS

This application claims the benefit of U.S. Provisional Application Ser. No. 62/624,179 filed Jan. 31, 2018, the disclosure of which is hereby incorporated by reference as if fully restated herein.

TECHNICAL FIELD

Exemplary embodiments of the present invention relate generally to a system and method for secure communication using random numbers or blocks.

BACKGROUND AND BRIEF SUMMARY OF THE INVENTION

Random Block Security (RBS) is a system of encryption where a block of random numbers is used to perform encryption by providing a block that is equivalent in size to the data for encryption. Since each byte of data is modified randomly, the resulting cypher is secure and cannot effectively be decrypted. This form of encryption is traditionally referred to as "the one-time pad" and was often used in espionage for encryptions that were highly sensitive. This system effectively has a key that is the size of the data being encrypted, and therefore is not usually practical for simplistic applications. However, this system is extremely valuable for the delivery of smaller bursts of information of a highly sensitive and covert nature.

In order for an encryption system designed for communication to be successful, it is necessary that a large collection of random numbers be present on both sides of the communication connection. Such random numbers should be equivalent in amount and value. This large block of random numbers should be the size of the intended transmission. It is possible to develop random numbers from a source and transmit them to the receiving communications partner, however, this transmission needs to be encrypted as well, and equal in size as the ultimate data intended for secure transfer. To overcome these complex issues, and to develop a system and process which is practical for general security, a more complex and hybrid approach is desirable. The present invention seeks to overcome these, and other, issues.

A system and method for secure communication using random blocks or random numbers is provided. The system and method may utilize a block of random numbers for the security and encryption of transmissions over a communication network by expanding the block into a larger set of random numbers. In exemplary embodiments, the random numbers used in the block are true random numbers. By transmitting a small set of random numbers, themselves secured by one or more random encryptions, a much larger volume of random values may be produced which may be mirrored on each side of the transmission. In this way, the end result of random values will provide enhanced network security.

Further features and advantages of the systems and methods disclosed herein, as well as the structure and operation of various aspects of the present disclosure, are described in detail below with reference to the accompanying figures.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
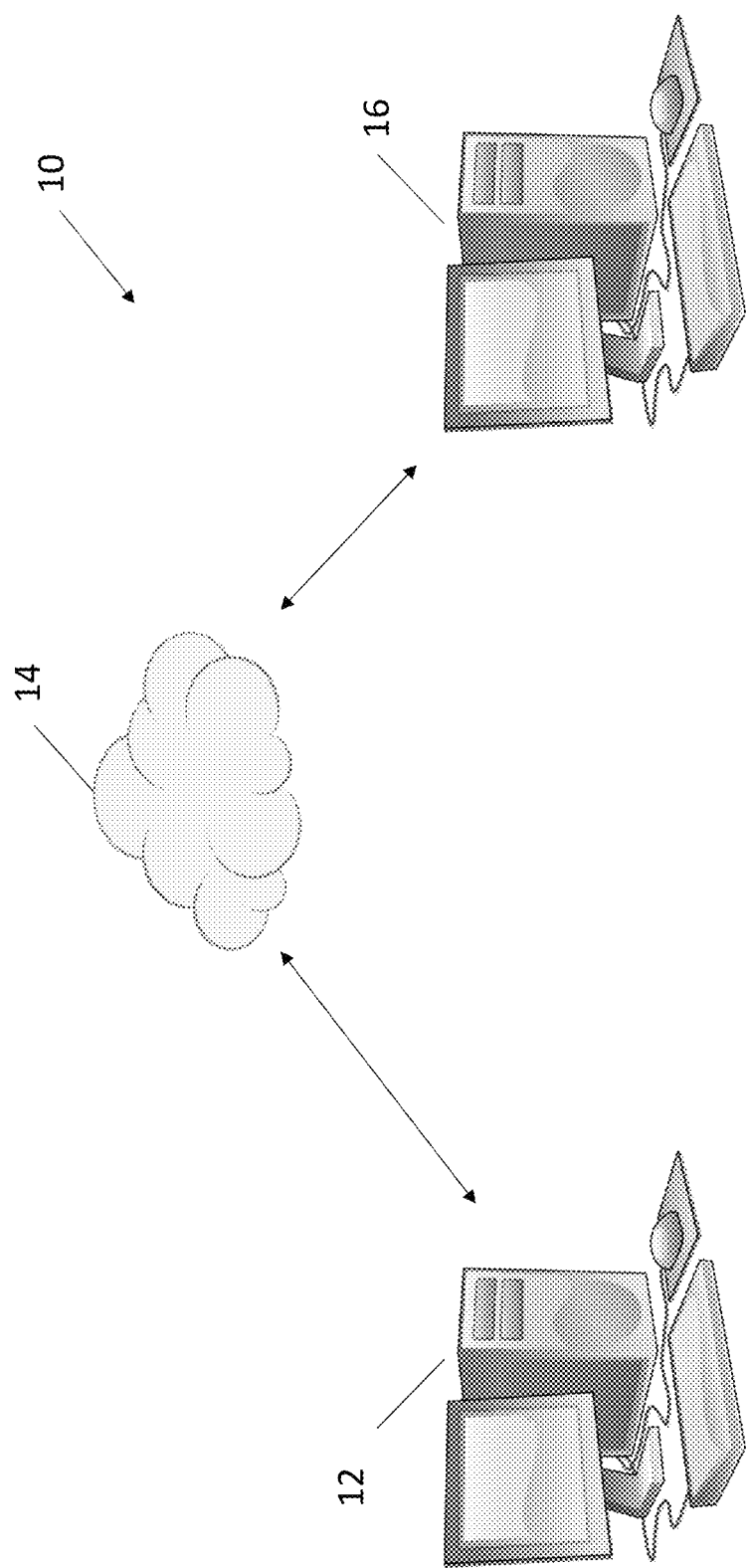
FIG. 1 is an exemplary communication system in accordance with the present invention.

FIG. 1 is an exemplary communication system 10 in accordance with the present invention. A first device 12 may be in communication with a second device 16. In exemplary embodiments, the first device 12 may be a sending device and the second device 16 may be a receiving device, though the reverse is contemplated. The first and second devices 12 and 16 may be electronic devices such as, but not limited to, personal computers, servers, databases, smartphones, tablets, or the like. The first and second devices 12 and 16 may be in wired or wireless electronic communication. In exemplary embodiments, the first and second devices 12 and 16 are in communication with one another by way of a network 14. The network 14 may be an IP network, the world wide web, an internet, an intranet, cellular network, some combination thereof, or the like. While two devices are illustrated, it is contemplated that any number of devices may be utilized and may be in communication with the same network 14, or a number of interconnected networks. Any of the devices may be utilized to transmit information and receive information.

Any and all of the devices 12 and 16 may comprise processors, electronic storage devices, network connectivity devices, and software instructions, which when executed, are configured to perform the operations and functions described herein.

Figure 2:
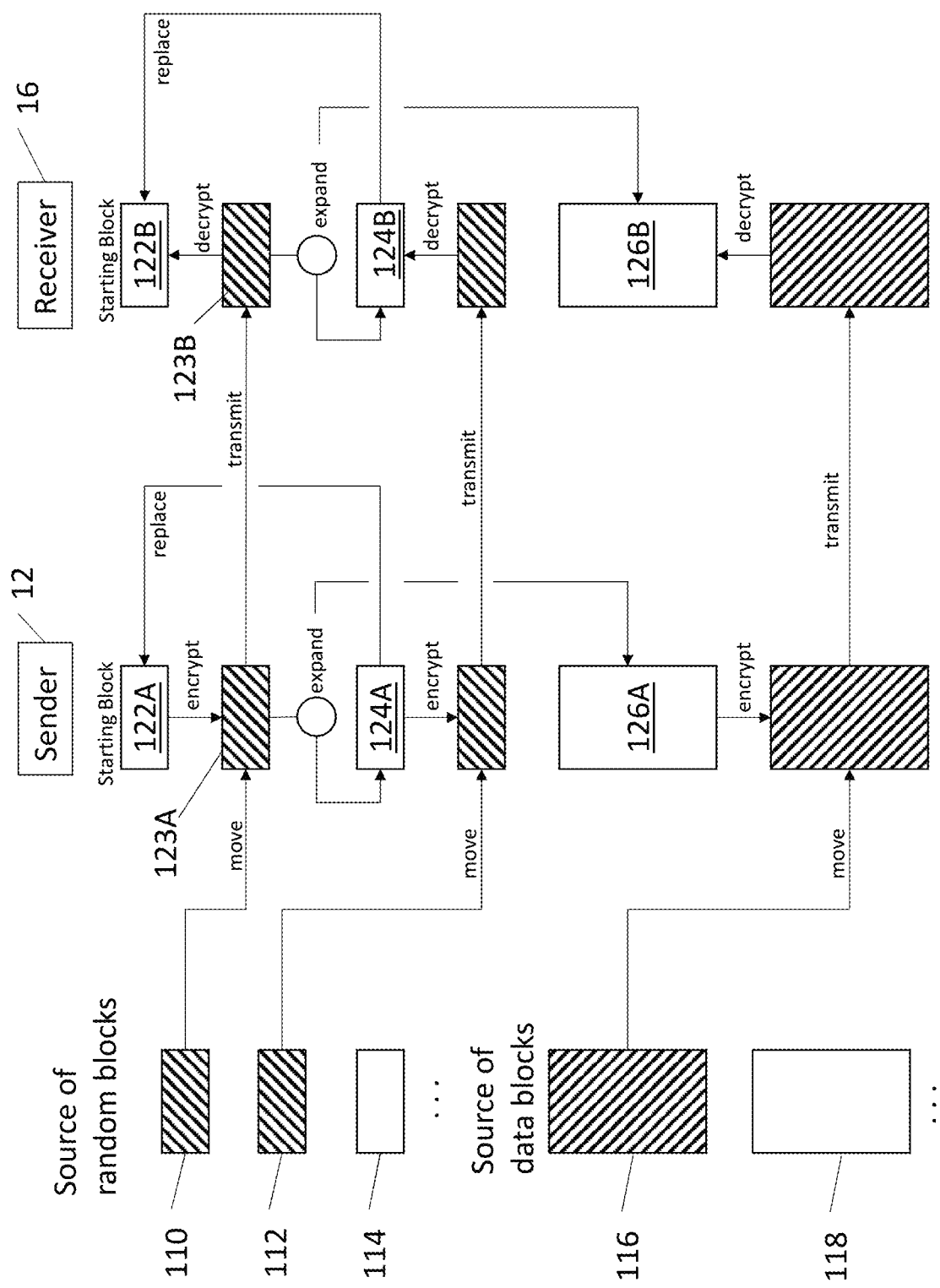
FIG. 2 is a simplified block diagram depicting the flow of random blocks and data blocks between and within a communication system of FIG. 1.

FIG. 2 is a simplified block diagram depicting the flow of random blocks and data blocks between and within the communication system 10 of FIG. 1. In order to facilitate a system and method of secure communication, devices 12 and 16 within the communication system 10 may comprise a supply of blocks of random numbers 110, 112, 114. While three blocks of random numbers are illustrated, it is contemplated that any number of blocks may be provided or subsequently generated. Each device 12 and 16 may receive a starting block 122A and 122B for beginning operation. In exemplary embodiments, the starting blocks 122A and 122B are a matched pair. This beginning starting block pair 122A and 122B may be installed externally or may be shipped as an encoded block within the routines. Focusing on the starting block 122A at the sending device 12, a random block may be selected from the source of random blocks 110, 112, and 114 and may be used to encrypt the starting blocks 122A and 122B. In the illustrated embodiment, random block 110 is selected, though this is merely exemplary and is not intended to be limiting.

The starting block 122A may be encrypted at the sending device 12 by use of the random block 110. The now encrypted starting block 123A may be transmitted to the receiving device 16 in the communication system 10 where it is received as encrypted block 123B. Once the encrypted starting data block 123B is received at the receiving device 16, it may be decrypted for use. Additionally, the received encrypted starting block 123B may be expanded into two further blocks: a first decrypted data block 124B and a second decrypted data block 126B. The first decrypted data block 124B may be configured to replace the starting block 122B for use with subsequent transmissions. The second decrypted data block 126B may be large enough to be used for secure data transmission of one or more source of data blocks 116 and 118 which may be located at the receiving device 16.

At the sending device 12, the encrypted starting block 123A may be expanded into a third decrypted data block 124A, which may replace the starting block 122A for subsequent transmissions, as well as a fourth decrypted data block 126A which may be large enough to be used for secure data transmission of the one or more source of data blocks 116 and 118 which may be located at the sending device 12.

The second fourth block 126A may be matched with one of the sources of data blocks 116 and 118. While two sources of data blocks 116 and 118 are illustrated, any number of blocks may be provided or subsequently generated for secure transmission. In the illustrated embodiment, source block 116 is selected, though this is merely exemplary and is not intended to be limiting. Source block 116 may be encrypted using the fourth decrypted block 126A and transmitted to the receiving device 16. Once received at the receiving device 16, the encrypted source block 116 may be decrypted using the decrypted starting block 122B.

Similarly, the second block 126B may be matched with one of the sources of data blocks 116 and 118. The source block 118, for example, may be encrypted using the second decrypted block 126B and transmitted to the sending device 12. Once received at the sending device 12, the encrypted source block 118 may be decrypted using the decrypted starting block 122A.

Since the starting block 122 is replaced by the first decrypted block 124 of the expansion, this process may be repeated for the entire transmission of the data blocks 116 and 118, so long as there is a sufficient stack of random blocks 110, 112, and 114 available at the sending device 12.

Expansion Process

Each random block 110, 112, and 114 may comprise two or more sets of random numbers. These sets of random numbers may be random in size, and both sets may be the same random size, though such is not required. These random sets may be denoted as:

Random Sets $[r_n, r_{n-1}, r_{n-2}, \ldots, r_2, r_1]$ $[d_n, d_{n-1}, d_{n-2}, \ldots, d_2, d_1]$ Where n=the number of random numbers within the given random block 110, 112, and 114, where there is a minimum number of two random numbers.

The expansion size of S, is the size required for a new starting block 122A and 112B, plus a block of numbers necessary to accommodate encryption of a given source of data block 116 and 118 for secure transmission. Therefore, if Y is a value of a random number to be included in the expansion, the formula for its production is:

$$Y_s = r_n d_r X^{n-1} + r_{n-1} d_{n-1} X^{n-2} + \ldots + r_2 d_2 X + r_1 d_1$$

Where X is the position within the expanded blocks. This formula may be repeated for every random number required for the expansion blocks 124 and 126. By utilizing real numbers as input to this process, and varying the number of random numbers within the process, the resulting cypher may be effectively secure, and an incalculable amount of processing would likely be necessary to detect any observable pattern within a given block. Since the overall transmission may utilize many individual blocks, the security would be effectively complete.

Figure 3:
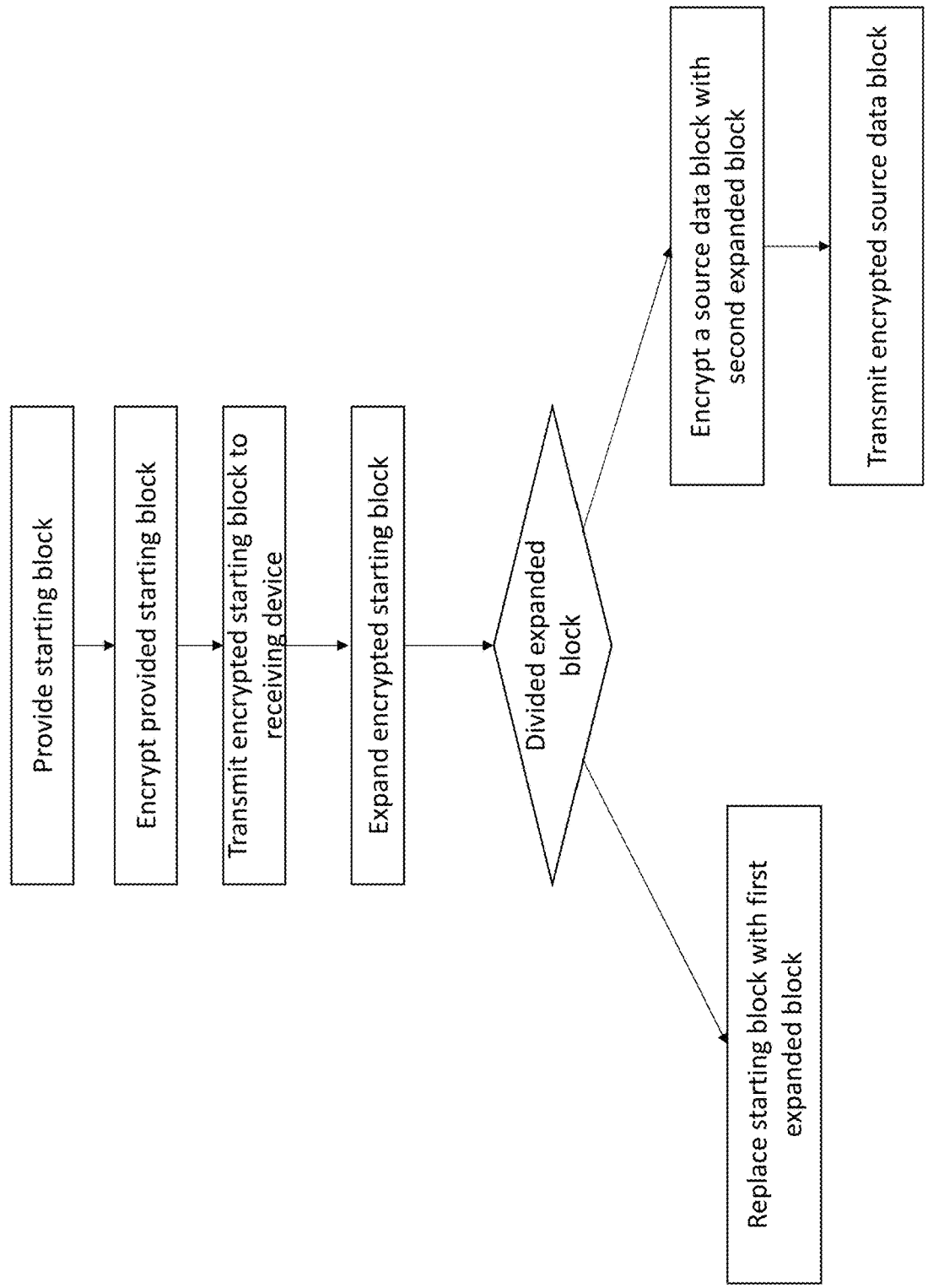
FIG. 3 is a flow chart illustrating exemplary logic for use with the system of FIGS. 1 and 2.

FIG. 3 is a flow chart illustrating exemplary logic for use with the system of FIGS. 1 and 2. A starting block 122A may be provided. The starting block 122A may be encrypted with any of the source random blocks 110, 112, or 114. The encrypted starting block 123A may be expanded by a random amount. In exemplary embodiments, the expansion size is an amount greater than or equal to the size of the source data block 116 or 118 to be securely transmitted plus the size of the starting block 122A. In exemplary embodiments, the exact amount of expansion is random over the minimum threshold. The expanded block may be divided into a first expanded block 124A and a second expanded block 126A. The first expanded block 124A may be configured to replace the starting block 122A for subsequent transmissions. The second expanded block 126A may be configured to encrypt one or the source data blocks 116 or 118. The now encrypted source data block 116 or 118 may be transmitted in a secure fashion from the sending device 12 to the receiving device 16.

The encrypted starting block 123A may also be transmitted from the sending device 12 to the receiving device 16 for decryption and use to decrypt the now encrypted source data block 116 and 118 at the receiving device 16.

The received encrypted starting block 123B may be expanded by an amount greater than or equal to the size of the source data block 116 or 118 to be securely transmitted plus the size of the starting block 122B. In exemplary embodiments, the exact amount of expansion is random over the minimum threshold. The expanded block may be divided into a first expanded block 124B and a second expanded block 126B.

The first expanded block 124B may be configured to replace the starting block 122B for subsequent transmissions. The second expanded block 126B may be configured to encrypt one of the source data blocks 116 or 118 for transmission back to the sending device 12. In this way, the now encrypted source data block 116 or 118 may be transmitted in a secure fashion back to the sending device 12 if desired. The encrypted starting block 123B may also be transmitted from the receiving device 16 to the sending device 12 for decryption and use to decrypt the now encrypted source data block 116 or 118 at the sending device 12.

The use of the designator "A" may signify operations or blocks used on the sending device 12 while the use of the designator "B" may signify operations or blocks used on the receiving device 16, though such is not required and it is contemplated that any of the so-designated items may be used with any device in the communications system 10.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method of using a relatively small block of random numbers to secure a relatively large transmission comprising the steps of:
   providing a sending device and a receiving device;
   creating a first block of random numbers at the sending device;
   encrypting the first block of random numbers;
   transmitting the first block of random numbers to the receiving device;
   decrypting the first block of random numbers at the receiving device to create a second block of random numbers of equal size to the first block;
   expanding the second block of random numbers with a formula that uses a random number of random numbers to increase the number of random numbers contained with the second block;
   dividing the expanded second block into:
      a first expanded block configured for use in subsequent transmissions of new random numbers, and
      a second expanded block configured for use in data transmission of source data.

2. The method of claim 1, wherein:
the transmission is sent over an IP network.

3. The method of claim 1, wherein:
the sending device and the receiving device are electronic devices connected to one another by way of a network.

4. The method of claim 1, further comprising the steps of:
   encrypting a block of source data at the sending device with the first block;
   transmitting the encrypted block of source data to the receiving device; and
   decrypting, at the receiving device, the received encrypted block of source data with the second block.

5. A method for secure communication comprising the steps of:
   providing a sending device comprising a first starting block, a first random block, and a first source data block;
   providing a receiving device;
   encrypting, at the sending device, the first starting block with the first random block;
   transmitting the encrypted first starting block to the receiving device;
   decrypting, at the receiving device, the encrypted first starting block;
   expanding, at the sending device, the encrypted first starting block by a random amount greater than or equal to the size of the first source data block;
   dividing the expanded first starting block into:
      a first expanded block, and
      a second expanded block sized to accommodate the first source data block;
   encrypting the first source data block with the second expanded block;
   transmitting the encrypted first source data block to the receiving device;
   decrypting, at the receiving device, the encrypted source data block with the decrypted first starting block.

6. The method of claim 5, wherein:
replacing the first starting block located at the receiving device with the first expanded block.

7. The method of claim 6, wherein:
the first expanded block is configured to be used with subsequent transmissions.

8. The method of claim 7, further comprising the steps of:
   providing a second source data block at the receiving device;
   decrypting, at the receiving device, the encrypted first starting block;
   expanding, at the receiving device, the decrypted first starting block by a second random amount to create a new expanded block, wherein the new expanded block is greater than or equal to the size of the second source data block; and
   dividing the new expanded block into:
      a third expanded block, and
      a fourth expanded block.

9. The method of claim 8, wherein:
the third expanded block is configured to replace the decrypted first starting block for use with subsequent transmissions.

10. The method of claim 9, wherein:
the fourth expanded block is sized to encrypt the second source data block.

11. The method of claim 10, further comprising the steps of:
   transmitting the third expanded block to the sending device for decryption;
   encrypting the second source data block with the fourth expanded block;
   transmitting the encrypted second source data block to the sending device; and
   decrypting, at the sending device, the received encrypted second source data block with the decrypted third expanded block.

12. The method of claim 11, wherein:
the random amount is the same as the second random amount.

13. The method of claim 5, wherein:
the sending device and the receiving device are electronic devices in electronic communication with one another by way of a network.

14. The method of claim 13, wherein:
the sending device and the receiving device are electronic devices in electronic communication with one another.

15. The method of claim 14, wherein:
the network is an IP network.

16. A system for secure communication comprising:
a receiving device comprising software instructions; and
a sending device in communication with the receiving device and comprising a first starting block, a first random block, a first source data block, and software instructions, which when executed, configure the sending device to:
- encrypt the first starting block with the first random block,
- transmit the encrypted first starting block to the receiving device,
- expand the encrypted first starting block by a random amount,
- divide the expanded first starting block into:
  - a first expanded block, and
  - a second expanded block,
- encrypt the first source data block with the second expanded block, and
- transmit the encrypted source data block to the receiving device;

wherein the software instructions of the receiving device, when executed, configure the receiving device to:
- decrypt the encrypted first starting block, and
- decrypt the encrypted source data block with the decrypted first starting block.

17. The system of claim 16 wherein:
the receiving device further comprises a second set of software instructions, which when executed, configure the receiving device to:
- expand, at the receiving device, the encrypted first starting block by a second random amount to generate at a second expanded starting block; and
- divide the second expanded starting block into:
  - a third expanded block configured to replace the second starting block for use with subsequent transmissions, and
  - a fourth expanded block sized to encrypt a second source data block.

18. The system of claim 17 wherein:
the receiving device further comprises a second source data block and a third set of software instructions, which when executed, configure the receiving device to:
- transmit the third expanded block to the sending device for decryption,
- encrypt the second source data block with the fourth expanded block,
- transmit the encrypted second source data block to the sending device, and
- decrypt, at the sending device, the received encrypted second source data block with the decrypted third expanded block.

19. The system of claim 18 wherein:
the random amount is greater than the size of the first source data block; and
the second random amount is greater than the size of the second source data block.

20. The system of claim 17 wherein:
the sending device and the receiving device are electronic devices in communication with one another by way of an IP network.

* * * * *

UNITED STATES PATENT AND TRADEMARK OFFICE
CERTIFICATE OF CORRECTION

PATENT NO. : 10,574,439 B2
APPLICATION NO. : 16/263007
DATED : February 25, 2020
INVENTOR(S) : Rankin et al.

Page 1 of 1

It is certified that error appears in the above-identified patent and that said Letters Patent is hereby corrected as shown below:

In the Claims

Column 6, In Claim 13, Line 4:
Please delete "by way of a network".

Column 6, In Claim 14, Line 3:
Please insert --by way of a network-- after --with one another--.

Signed and Sealed this
Fifth Day of May, 2020

Andrei Iancu
*Director of the United States Patent and Trademark Office*